US008580418B2

(12) United States Patent
Istvan

(10) Patent No.: US 8,580,418 B2
(45) Date of Patent: Nov. 12, 2013

(54) NON-WOVEN FIBROUS MATERIALS AND ELECTRODES THEREFROM

(75) Inventor: Rudyard Istvan, Ft. Lauderdale, FL (US)

(73) Assignee: NanoCarbons LLC, Fort Lauderdale, FL (US)

( * ) Notice: Subject to any disclaimer, the term of this patent is extended or adjusted under 35 U.S.C. 154(b) by 0 days.

(21) Appl. No.: 13/109,702

(22) Filed: May 17, 2011

(65) Prior Publication Data

US 2011/0220393 A1 Sep. 15, 2011

Related U.S. Application Data

(62) Division of application No. 11/345,188, filed on Jan. 31, 2006.

(51) Int. Cl.
| | |
|---|---|
| H01M 2/14 | (2006.01) |
| H01M 6/00 | (2006.01) |
| H01M 10/00 | (2006.01) |
| H01M 4/02 | (2006.01) |
| H01M 4/13 | (2010.01) |
| H01M 6/48 | (2006.01) |
| H01M 10/18 | (2006.01) |
| H01M 4/58 | (2010.01) |
| H01M 8/00 | (2006.01) |
| H01M 8/16 | (2006.01) |
| B32B 9/00 | (2006.01) |
| B32B 15/04 | (2006.01) |
| D01F 9/12 | (2006.01) |
| D01C 5/00 | (2006.01) |
| C01B 31/08 | (2006.01) |
| H01B 5/00 | (2006.01) |

(52) U.S. Cl.
USPC ........... 429/129; 429/122; 429/209; 429/210; 429/218.1; 429/400; 428/408; 428/367; 423/447.1; 264/29.2; 502/423; 174/126.1

(58) Field of Classification Search
USPC ............. 429/400, 122, 209, 210, 218.1, 129; 428/408, 367; 423/447.1; 264/29.2; 502/423; 174/126.1
See application file for complete search history.

(56) References Cited

U.S. PATENT DOCUMENTS

| | | | |
|---|---|---|---|
| 3,288,641 A | 11/1966 | Rightmire | |
| 4,264,320 A | 4/1981 | White | |
| 4,412,937 A | 11/1983 | Ikegami et al. | |
| 4,439,349 A | 3/1984 | Everett et al. | |
| 4,460,650 A | 7/1984 | Ogawa et al. | |
| 4,552,750 A | 11/1985 | van der Wal et al. | |
| 4,565,727 A | 1/1986 | Giglia et al. | |
| 4,704,196 A | 11/1987 | Saito et al. | |
| 4,731,705 A | 3/1988 | Velasco et al. | |
| 5,041,195 A | 8/1991 | Taylor et al. | |
| 5,202,302 A | 4/1993 | De La Pena et al. | |
| 5,242,879 A | 9/1993 | Abe et al. | |
| 5,482,906 A | 1/1996 | Sakai et al. | |
| 5,488,023 A | 1/1996 | Gadkaree et al. | |
| 5,626,977 A | 5/1997 | Mayer et al. | |
| 5,706,165 A | 1/1998 | Saito et al. | |
| 5,776,633 A | 7/1998 | Mrotek et al. | |
| 5,877,935 A | 3/1999 | Sato et al. | |
| 5,898,564 A | 4/1999 | Mayer et al. | |
| 5,907,471 A | 5/1999 | Patel et al. | |
| 5,922,300 A | 7/1999 | Nakajima et al. | |
| 5,951,959 A | 9/1999 | Nishimura | |
| 5,956,225 A | 9/1999 | Okuyama et al. | |
| 5,963,417 A | 10/1999 | Anderson et al. | |
| 5,990,041 A | 11/1999 | Chung et al. | |
| 5,997,829 A | 12/1999 | Sekine et al. | |
| 6,024,899 A | 2/2000 | Peng et al. | |
| 6,080,504 A | 6/2000 | Taylor et al. | |
| 6,103,373 A | 8/2000 | Nishimura et al. | |
| 6,183,189 B1 | 2/2001 | Lzu et al. | |
| 6,205,016 B1 | 3/2001 | Niu | |
| 6,228,803 B1 | 5/2001 | Gadkaree et al. | |
| 6,248,691 B1 | 6/2001 | Gadkaree et al. | |
| 6,288,888 B1 | 9/2001 | Sakata et al. | |
| 6,297,293 B1 | 10/2001 | Bell et al. | |
| 6,451,073 B1 | 9/2002 | Farahmandi et al. | |
| 6,491,789 B2 | 12/2002 | Niu | |
| 6,503,382 B1 | 1/2003 | Bartlett et al. | |
| 6,616,435 B2 | 9/2003 | Lee et al. | |
| 6,627,252 B1 | 9/2003 | Nanjundiah et al. | |
| 6,631,073 B1 | 10/2003 | Sakata et al. | |
| 6,631,074 B2 | 10/2003 | Bendale et al. | |
| 6,643,119 B2 | 11/2003 | Nanjundiah et al. | |
| 6,660,583 B2 | 12/2003 | Fujino et al. | |
| 6,673,328 B1 | 1/2004 | Klett et al. | |

(Continued)

FOREIGN PATENT DOCUMENTS

| | | |
|---|---|---|
| CN | 1760414 A | 4/2006 |
| EP | 0742295 A2 | 11/1996 |

(Continued)

OTHER PUBLICATIONS

Typical Real Dictionary May 2003 {http://www.realdictionary.com/?q=typical}.*
ISO Technical Management Board (Report No. 12/2005; May 28, 2005.*
Ivanov et al Chemical Physics Letters vol. 223 No. 4 pp. 329-335 Abstract.*
M. Arulepp, L. Permann, J. Leis, A. Perkson, K. Rumma, A. Jänes, and E. Lust, "Influence of the solvent properties on the characteristics of a double layer capacitor", 133 J. Power Sources 320, 320-328 (Elsevier B.V. 2004).

(Continued)

*Primary Examiner* — Patrick Ryan
*Assistant Examiner* — Aaron Greso
(74) *Attorney, Agent, or Firm* — Brinks Gilson & Lione

(57) ABSTRACT

Fibrous materials composed of activated carbon fibers and methods for their preparation are described. Electrodes comprising the fibrous materials are also disclosed.

24 Claims, 1 Drawing Sheet

(56) References Cited

U.S. PATENT DOCUMENTS

| | | | |
|---|---|---|---|
| 6,697,249 | B2 | 2/2004 | Maletin et al. |
| 6,713,011 | B2 | 3/2004 | Chu et al. |
| 6,737,445 | B2 | 5/2004 | Bell et al. |
| 6,753,454 | B1 | 6/2004 | Smith et al. |
| 6,790,528 | B2 | 9/2004 | Wendorff et al. |
| 6,804,108 | B2 | 10/2004 | Nanjundiah et al. |
| 6,805,730 | B2 | 10/2004 | Herczeg |
| 6,879,482 | B2 | 4/2005 | Kawasato et al. |
| 6,934,144 | B2 | 8/2005 | Ooma et al. |
| 7,056,455 | B2 | 6/2006 | Matyjaszewski et al. |
| 7,214,640 | B2 | 5/2007 | Margetts |
| 7,214,646 | B1 | 5/2007 | Fujino et al. |
| 7,268,995 | B2 | 9/2007 | Yoshida et al. |
| 7,296,691 | B2 | 11/2007 | Koslow |
| 7,370,657 | B2 | 5/2008 | Zhuang et al. |
| 7,517,832 | B2 | 4/2009 | Sakurai et al. |
| 2002/0008956 | A1* | 1/2002 | Niu .............. 361/502 |
| 2003/0026755 | A1 | 2/2003 | Jaroniec et al. |
| 2003/0185741 | A1 | 10/2003 | Matyjaszewski et al. |
| 2004/0024074 | A1 | 2/2004 | Tennison et al. |
| 2004/0047798 | A1 | 3/2004 | Oh et al. |
| 2004/0062989 | A1* | 4/2004 | Ueno et al. .............. 429/217 |
| 2004/0091415 | A1 | 5/2004 | Yu et al. |
| 2004/0097369 | A1 | 5/2004 | Freel et al. |
| 2005/0025974 | A1 | 2/2005 | Lennhoff |
| 2005/0207902 | A1 | 9/2005 | Bonofacio et al. |
| 2005/0207961 | A1 | 9/2005 | Brooks et al. |
| 2005/0207962 | A1 | 9/2005 | Dietz et al. |
| 2005/0219788 | A1 | 10/2005 | Chow et al. |
| 2005/0266990 | A1 | 12/2005 | Iwasaki et al. |
| 2006/0040157 | A1 | 2/2006 | Popov et al. |
| 2006/0165584 | A1 | 7/2006 | Gogotsi et al. |
| 2006/0263288 | A1 | 11/2006 | Pak et al. |
| 2006/0291140 | A1 | 12/2006 | Kazaryan et al. |
| 2007/0021300 | A1 | 1/2007 | Farant |
| 2007/0048521 | A1 | 3/2007 | Istvan |
| 2007/0178310 | A1 | 8/2007 | Istvan |
| 2008/0254972 | A1 | 10/2008 | Istvan et al. |
| 2009/0246528 | A1 | 10/2009 | Istvan |
| 2012/0007027 | A1 | 1/2012 | Istvan |

FOREIGN PATENT DOCUMENTS

| | | | |
|---|---|---|---|
| EP | 0855373 | A1 | 7/1998 |
| EP | 1371607 | A2 | 12/2003 |
| EP | 1526114 | A1 | 4/2005 |
| EP | 1734547 | A1 | 12/2006 |
| JP | 63-218159 | A | 9/1988 |
| JP | 03-501509 | A | 4/1991 |
| JP | 04-286108 | A | 10/1992 |
| JP | 06-501910 | A | 3/1994 |
| JP | 2001-135555 | A | 5/2001 |
| JP | 2005-001969 | A | 1/2005 |
| JP | 2005-026343 | A | 1/2005 |
| KR | 2000-0058668 | A | 10/2000 |
| KR | 10-2001-0040825 | A | 5/2001 |
| KR | 10-2002-0007458 | A | 1/2002 |
| KR | 2002-0042650 | A | 6/2002 |
| KR | 10-0371402 | B | 2/2003 |
| KR | 20050014033 | A | 2/2005 |
| KR | 10-0675923 | B1 | 1/2007 |
| RU | 2031837 | C1 | 3/1995 |
| RU | 2223911 | C1 | 2/2004 |
| WO | WO 90/03458 | A1 | 4/1990 |
| WO | WO 90/05798 | A1 | 5/1990 |
| WO | WO 92/06919 | A1 | 4/1992 |
| WO | WO 94/13024 | A1 | 6/1994 |
| WO | WO 00/11688 | A1 | 3/2000 |
| WO | WO 01/89991 | A1 | 11/2001 |
| WO | WO 02/21615 | A2 | 3/2002 |
| WO | WO 02/49412 | A1 | 6/2002 |
| WO | WO 2004/099073 | A2 | 11/2004 |
| WO | WO 2005/118471 | A1 | 12/2005 |
| WO | WO 2007/024245 | A1 | 3/2007 |
| WO | WO 2007/091995 | A2 | 8/2007 |
| WO | WO 2007/120386 | A2 | 10/2007 |
| WO | WO 2008/100573 | A1 | 8/2008 |
| WO | WO 2009/137694 | A2 | 11/2009 |
| WO | WO 2010/006155 | A2 | 1/2010 |

OTHER PUBLICATIONS

M. Arulepp, J. Leis, A. Kuura, M. Latt, H. Kuura, L. Permann, F. Miller, K. Rumma, Performance of Supercapacitors Based on Carbide Derived SkeletonC, Proceedings of the 15th International Seminar on Double-Layer Capacitors and Hybrid Energy Storage Devices, 249-260 (Deerfield Beach, Florida, Dec. 5-7, 2005).

M. Arulepp, J. Leis, M. Lätt, F. Miller, K. Rumma, E. Lust, A.F. Burke, The advanced carbide-derived carbon based supercapacitor, 162(2) J. Power Sources 1460, 1460-1466 (Elsevier B.V. 2006) Abstract.

Babic et al., "Characterization of Carbon Cryogels Synthesized by Sol-Gel Polycondensation", *J. Serb. Chem.*, vol. 70, No. 1, pp. 21-31, 2005.

Barbieri, "Capacitance limits of high surface area activated carbons for double layer capacitors", *Carbon*, No. 43, pp. 1303-1310, 2005.

Y. V. Basova, D. D. Edie, P. Y. Badheka, H. Bellam, The effect of precursor chemistry and preparation conditions on the formation of pore structure in metal-containing carbon fibers, 43 *Carbon* 1533, 1533-1545 (Elsevier Science Ltd. 2005).

Becker, "Carbon Copy," *Research Horizons Magazine*, Winter 2004, 3 pages.

Becker, "Protecting Big Birds", *Research Horizons*, Winter 2004. 1 page.

Becker, Supercapacitors: Researchers Develop Manufacturing Technology to Produce Electrical Devices from Carbon Nanotubes, *Research Horizons Magazine*, Apr. 13, 2004, 3 pages.

Bertalan et al., "Polymers for Advanced Technologies", *Chem. Intl.*, pp. 28-31, 2006.

Burke, "Ultracapacitors: Why, How, and Where is the Technology", *J. Power Sources*, vol. 91, pp. 37-50, 2000.

T.A. Centeno, F. Stoeckli, On the specific double-layer capacitance of activated carbons, in relation to their structural and chemical properties, 154 J. Power Sources 314, 314-320 (Elsevier B.V. 2006).

Chmiola et al. "Anomalous Increase in Carbon Capacitance at Pore Sizes Less Than 1 Nanometer", *Science Express*, (10. 1126/science.1132195), p. 1, Aug. 17, 2006.

Chmiola et al., "Effect of pore size and surface area of carbide derived carbons on specific capacitance", *J. Power Sources*, vol. 158, No. 1, pp. 765-772, 2006.

J. Chmiola, G. Yushin, R. K. Dash, E. N. Hoffman, J. E. Fischer, M. W. Barsoum, and Y. Gogotsi, Double-Layer Capacitance of Carbide Derived Carbons in Sulfuric Acid, 8(7) Electrochem. and Solid State Letters, A357-A360 (2005).

Deryn Chu et al., "Ceria Based Nano-Scale Catalysts for Water-Gas Shift (WGS) Reaction", US Army Research Laboratory, 5 pages.

Yoseph Bar-Cohen, "Smart Structures and Materials 2004: Electroactive Polymer Actuators and Devices" (EAPAD), The International Society for Optical Engineering, Jul. 2004, 16 pages.

James B. Condon, Surface Area and Porosity Determinations by Physiosorption pp. 160-168 (Elsevier Science & Technology Books 2006).

Conway, "Electrochemical Capacitors", *Electrochemistry Encyclopedia* Maintained by the Electrochemical Science and Technology Information Resource (ESTIR), Yeager Center for Electrochemical Science (YCES), Case Western Reserve University, 2003. www.electrochem.cwru.edu. 14 pages.

Atul Dahiya et al., "Dry-Laid Nonwovens", http://www.engr.utk.edu./mse/pages/Textiles/Dry%20Laid%20Nonwovens.htm, pp. 1-10.

Chunsheng Du, Jeff Yeh and Ning Pan, "Carbon Nanotube Thin Films With Ordered Structures", J. Mater. Chem. vol. 15, No. 5, pp. 548-550, 2005.

James Economy, Design of Advanced Materials for Water Purification, The 8th Polymers for Advanced Technologies International Symposium, Budapest, Hungary, Sep. 13-16, 2005.

(56) References Cited

OTHER PUBLICATIONS

Eliad et al., "Ion Sieving Effects in the Electrical Double Layer of Porous Carbon Electrodes: Estimating Effective Ion Size in Electrolytic Solutions", *Journal of Physical Chemistry B*, vol. 105, No. 29, pp. 6880-6887, 2001.
M. Endo, T. Maeda, T. Takeda, Y. J. Kim, K. Koshiba, H. Hare, and M. S. Dresselhaus, Capacitance and Pore-Size Distribution in Aqueous and Nonaqueous Electrolytes Using Various Activated Carbon Electrodes, 148(8) J. Electrochem. Soc.: A910, A910-A914 (The Electrochemical Society 2001).
Endo et al., "Structure and Application of Various Saran-Based Carbons to Aqueous Electric Double-Layer Capacitors", *J. Electro. Soc.*, vol. 149, 11, pp. A1473-A1480, 2002.
Endo et al., "Morphology and organic EDLC applications of chemically activated AR-resin-based carbons", *Carbon*, vol. 40, No. 14, pp. 2613-2626, 2002.
S. Escribano, S. Berthon, J.L. Ginoux et P Achard, "Characterization of carbon aérogels", Eurocarbon'98, Science and Technology of Carbon (GFEC), vol. 2, Strasbourg (Jul. 5-9, 1998), 841-842.
Extended European Search Report issued in corresponding European Patent Application No. 06849690.0, May 10, 2011. 8 pages.
J.L. Figueiredo, Ph. Serp, B. Nysten, J.-P. Issi, Surface treatments of vapor-grown carbon fibers produced on a substrate: Part II: Atomic force microscopy, 37(11) Carbon 1809, 1809-1816 (Elsevier Science Ltd. 1999).
H. P. Fink, P. Weigel, H. J. Purz, J. Ganster, "Structure formation of regenerated cellulose materials from NMMO-solutions", 26(9) Progress in Polymer Sci. 1473, 1473-1524, Figure 18 (Elsevier B.V. 2001).
Frackowiak et al., Supercapacitor Electrodes From Multiwalled Carbon Nanotubes, *App. Physics Lett.*, vol. 77, 15, pp. 2421-2443, 2000.
Frackowiak et al., "Carbon materials for the electrochemical storage of energy in capacitors", *Carbon*, vol. 39, pp. 937-950, 2001.
Fu et al., "Studies of the Chemical and Pore Structures of the Carbon Aerogels Synthesized by Gelation and Supercritical Drying in Isopropanol", *J. Appl. Polym. Sci.*, vol. 91 pp. 3060-3067, 2004.
Fuertes, "Templated Mesoporous Carbons for Supercapacitor Application", *Electrochimica Acta*, vol. 50. No. 14, pp. 2799-2805, 2005.
T. Fujino, B. Lee, S. Oyama, M. Noguchi, Honda R&D Company Ltd., Tochigi Japan, Characterization of Advanced Mesophase Carbons Using a Novel Mass Production Method, Proceedings of the 15th International Seminar on Double-Layer Capacitors and Hybrid Energy Storage Devices, 75-83 (Deerfield Beach, Florida, Dec. 5-7, 2005).
M. Gan et al., "Predicting Packing Characteristics of Particles of Arbitrary Shapes", KONA No. 22, pp. 82-90. (2004).
G. Garnweitner et al., "Nonaqueous and surfactant-free synthesis routes to metal oxide nanoparticles". J. Am. Ceram. Soc. vol. 89, No. 6, 1801-1808, 2006.
Gavalda et al., Nitrogen Adsorption in Carbon Aerogels: A molecular simulation study. *Langmuir—The American Chemical Society*, vol. 18, No. 6, pp. 2141-2151, 2002.
Ghosh et al., "Development of Layered Functional Fiber Based Micro-Tubes", *National Textile Center Annual Report*, NTC Project F02-NS05, pp. 1-9, 2002.
Imre Gyuk (manager of the Energy Storage Research Program, DOE), Utility Scale Electricity Storage,(speaker 4, slides 13-15, Advanced Capacitors World Summit 2006), 29 pages.
Hanzawa et al., "The Pore Structure Determination of Carbon Aerogels", *Adsorption*, vol. 4, No. 3-4, pp. 187-195, 1998.
Harris, "New Perspectives on the Structure of Graphitic Carbons", *Critical Reviews in Solid State & Material Sciences*, vol. 30, pp. 235-253, 2005.
Harris et al., "High-resolution electron microscopy of a microporous carbon", *Philos. Mag. Letters*, vol. 80, No. 6, pp. 381-386, 2000.
Hegde et al., "Carbon Fibers", Updated Apr. 2004. http://www.engr.utk.edu/mse/Textiles/CARBON%20FIBERS.htm, 7 pages.
Hong et al., "Preparation of Mesoporous Activated Carbon Fibers by Catalytic Gasification", *Korean J. Chem. Eng.*, vol. 17, No. 2, pp. 237-240, 2000.
Hosotsubo et al., "R&D on High-Performance Electrode Materials Using Petroleum Pitch-based Carbon Fiber," *Petroleum Energy Center*, pp. 1-10, 2001, 10 pages.
Howell, 2005 Annual Progress Report: Energy Storage Research and Development (U.S. Department of Energy, Jan. 2006) 144 pages.
C. Hu, C. Wang, F. Wu, and R. Tseng, Characterization of pistachio shell-derived carbons activated by a combination of KOH and CO2 for electric double-layer capacitors, 52(7) Electrochimica Acta, 2498, 2498-2505 (Elsevier Science Ltd. 2007).
Denisa Hulicova et al., "The Capacitive Performance of Nitrogen-Enriched Carbon in Different Electrolytes", National Institute of Advanced Industrial Science and Technology, 1 page.
Ikeda et al., "Material Development of Electric Double Layer Capacitor for Fuel Cell Electric Vehicle and the Newly Developed Electric Double Layer Capacitor", *Reports Res. Lab, Asahi Glass Co. Ltd.*, vol. 54, pp. 33-39, 2004.
K. Ikeda, Research Center, Asahi Glass Co., Ltd., Japan, Performance of Electric Double Layer Capacitors for High Power Application with Acetonitrile-Free Electrolyte System, Proceedings of the 16th International Seminar on Double-Layer Capacitors and Hybrid Energy Storage Devices, 177-203 (Deerfield Beach, Florida, Dec. 4-6, 2006).
International Preliminary Report on Patentability and Written Opinion for PCT Application No. PCT/US2008/001963, Jun. 24, 2008. 8 pages.
International Search Report for PCT Application No. PCT/US2008/001963, Jun. 24, 2008, 3 pages.
International Preliminary Report on Patentability and Written Opinion for PCT Application No. PCT/US2007/004182, Sep. 20, 2007, 6 pages.
International Search Report for PCT Application No. PCT/US/2007/004182, Sep. 20, 2007, 3 pages.
International Preliminary Report on Patentability and Written Opinion of the International Searching Authority for PCT Application No. PCT/US2009/050084, Jan. 20, 2011. 8 pages.
A. Jänes, H. Kurig, E. Lust, Characterisation of activated nanoporous carbon for supercapacitor electrode materials, 45 Carbon 1226, 1226-1233 (Elsevier Science Ltd. 2007).
Jiang et al., "Carbon Nanofibers Synthesized by Decomposition of Alcohol at Atmospheric Pressure", *App. Phys. Lett.*, vol. 81, 3, pp. 526-528, 2002.
Johnson, "Nanotubes enable dense supercapacitors", *Automotive Design Line*, Mar. 2005.
Kim et al., "Raman Spectroscopic Evaluation of Polyacrylonitrile-Based Carbon Nanofibers Prepared by Electrospinning", *J. Raman Spect.*, vol. 35, 11, pp. 928-933, 2004.
Kim et al., PVDC-Based Carbon Material by Chemical Activation and Its Application to Nonaqueous EDLC, *J. Electro. Soc.*, vol. 151, 6, pp. E199-E205, 2004.
Kim et al., "Electrochemical Properties of Carbon Nanofiber Web as an Electrode for Supercapacitor Prepared by Electrospinning", *Applied Physics Letters*, vol. 83, 6, pp. 1216-1218, 2003.
Kong et al., "Gas Permeability of Carbon Aerogels", *J. Mater. Res.*, vol. 8, No. 12, pp. 3100, 1996.
Kyotani, "Control of Pore Structure in Carbon", *Carbon*, vol. 38, pp. 269-286, 2000.
Lee et al., "Simple Synthesis of Uniform Mesoporous Carbons with Diverse Structures From Mesostructured Polymer/Silica Nanocomposites", *Chem. Materials*, vol. 16, pp. 3323-3330, 2004.
Lee et al., "Synthesis of new nanoporous carbon materials using nanostructured silica materials as templates", *J. Mater. Chem.*, vol. 14, pp. 478-486, 2004.
Lee et al., "Synthesis of a New Mesoporous Carbon and its Application to Electrochemical Double-Layer Capacitors", *Chem. Commun.*, pp. 2177-2178, 1999.
E. Levy and C. Kiely, Investigation of Fly Ash and Activated Carbon Obtained from Pulverized Coal Boilers, DOE Project DE-FG26-03NT41796 (Energy Research Center, Lehigh University 2005—Presented at DOE NETL University Coal Research Meeting, Jun. 7, 2005), 39 pages.
Dr. Angel Linares, "Methane Storage in Activated Carbon Fibres", Dept. of Inorganic Chemistry, Carbon and Environmental Group, 5 pages.

(56) References Cited

OTHER PUBLICATIONS

Lu et al., "Mesoporous Activated Carbon Filaments", *Carbon*, vol. 35, 3, pp. 427-430, 1997.
Miller et al., "Properties and Performance of Hybrid Aluminum Electrolytic/electrochemical Capacitors", *Evans Capacitor Company, Technical Papers*, 11 pages.
Miller et al., "Ultracapacitor Assisted Electric Drives for Transportation", *Maxwell Technologies Inc.* 14 pages.
J.M. Miller et al., "Deposition of Ruthenium Nanoparticles on *Carbon* Aerogels for High Energy Density Supercapacitor Electrodes", California Univ. Los Angeles Dept. of Materials Science and Engineering, 1 page.
Muñoz et al., "Phosphoric and Boric Acid Activation of Pine Sawdust", Journal of Chemical Technology & Biotechnology, vol. 78 Issue 12, pp. 1252-1258, 2003. Abstract. 2 pages.
Naminsnyk, Thesis entitled "A Survey of Electrochemical Supercapacitor Technology", *University of Technology*, Sydney, pp. 1-109, 2003.
Niederberger et al., "Organic Reaction Pathways in the Nonaqueous Synthesis of Metal Oxide Nanoparticles", *Chem. Eur. J.*, vol. 12, pp. 7282-7302, 2006.
Oya et al., "Formation of Mesopores in Phenolic Resin-Derived Carbon Fiber by Catalytic Activation Using Cobalt", *Carbon*, vol. 33, No. 8, pp. 1085-1090, 1995.
Ozaki et al., "Preparation of Platinum Loaded Carbon Fiber by Using a Polymer Blend", *Carbon*, vol. 35, No. 10, pp. 1676-1677, 1997.
Park et al, "Monodisperse Nanoparticles of Ni and NiO: Synthesis, Characterization, Self-Assembled Superlattices, and Catalytic Applications in the Suzuki Coupling Reaction", *Adv. Mater.* vol. 17, No. 4, pp. 429-434, 2005.
Pröbstle et al., "Button Cell Supercapacitors with Monolithic Carbon Aerogels", *J. Power Sources*, vol. 105, pp. 189-194, 2002.
Qu et al., "Studies of activated carbons used in double-layer capacitors", *J. Power Sources*, vol. 74, pp. 99-107, 1998.
W. M. T. M. Reimerink and R. W. Koedijk, NORIT, Netherland, B.V., Netherlands, The Influence of the Pore Size Distribution of Activated Carbons on the Power and Energy Density, Proceedings of the 16th International Seminar on Double-Layer Capacitors and Hybrid Energy Storage Devices, 256-281 (Deerfield Beach, Florida, Dec. 4-6, 2006).
Shi, "Activated Carbons and Double Layer Capacitance", *Electrochimica Acta*, vol. 41, No. 10, pp. 1633-1639, 1996.
S. Shiraishi, H. Kurihara, L. Shi, T. Nakayama, and A. Oya, Electric Double-Layer Capacitance of Meso/Macroporous Activated Carbon Fibers Prepared by the Blending Method, 149(7) J. Electrochem. Soc. A855, A855-A861 (The Electrochemical Society 2002).
Smith et al., "Evaluation of Carbon Electrodes for Non-Aqueous Asymmetric EDL Capacitors", *Proceedings of the 16th International Seminar on DLC*, U. S. Naval Surface Warfare Center, Dec. 4-6, 2006. 26 pages.
Smith et al, "Activated Carbon Electrodes For Non-Aqueous Asymmetric Capacitors", http://www.apsci.com/ppi-pyro3.html. pp. 571-574.
Soneda et al., "Huge Electrochemical Capacitance of Exfoliated Carbon Fibers", *Carbon*, vol. 41, pp. 2680-2682, 2003.
Tom Stieghorst, "Spotless Ships Have Not Curtailed Disease Outbreaks", Sun-sentinel.com.
Geoffrey F. Strouse et al., "A Self-Assembly Approach to Molecularly Engineered Titanium Surfaces: Applications Towards Selective Photo-Oxidation", Los Alamos National Laboratory, Dept. of Chem. Science & Technology, Los Alamos, NM, 15 pages.
Yu-Lee Tai, "Application of Porous and Nanosized Nickel in Electrochemical Energy Storage", Masters Thesis, etd-0725105-163206, Department of Chemical Engineering, National Cheng Kung University, Taiwan. Abstract 2002.
Tamai et al., "Synthesis of Extremely Large Mesoporous Activated Carbon and Its Unique Adsorption for Giant Molecules", *Chem. Mater.*, vol. 8, pp. 454-462, 1996.

Tamai et al., "Highly Mesoporous Carbon Electrodes for Electric Double-Layer Capacitors", *Electrochemical and Solid-State Letters*, vol. 6, No. 10, pp. A214-A217, 2003.
I. Tanahashi, Comparison of the characteristics of electric double-layer capacitors with an activated carbon powder and an activated carbon fiber, 35 J. Applied Electrochemistry 1067-1072 (Springer 2005).
Toyoda et al., "Exfoliated Carbon fibers as Electrode For EDLC in $H_2SO_4$", The Electrochemical Society, $206^{th}$ meeting, ABST 642, 2004.
Tran et al., "Carbon Aerogels and Their Applications in Supercapacitors and Electrosorption Processes", Chemistry & Materials Science Dept., Lawrence Livermore National Laboratory, Livermore, CA 94550, 6 pages.
Gregor Trimmel et al., "Sol-Gel Processing of Alkoxysilyl-Substituted Nickel Complexes for the Preparation of Highly Dispersed Nickel in Silica", New Journal of Chemistry, 2002, 26(6), pp. 759-765. Abstract.
Unknown Author, "Basic Properties of Carbon Nanotubes", 2002-2005, Applied Technologies, Inc. 6 pages.
Unknown Author, "Carbon Fiber Guide", Asbury Graphite Mills, Inc., Jun. 2003, 1 page.
Unknown Author, "Mesoporous Activated Carbons with Metal Oxide Nanoparticles," www.aist.go.jp, 2001, 2 pages.
Unknown Author, "Choosing the Proper Short Cut Fiber for Your Web", Minifibers, Inc. www.minifibers.com, 6 pages.
Unknown Author, "Pyrograf III", Pyrograf Products Incorporated, http://www.apsci.com/ppi-pyro3.html, 4 pages.
P. Walmet, L. H. Hiltzik, E. D. Tolles, B. J. Craft and J. Muthu, MeadWestvaco, Charleston, SC, USA, Electrochemical Performance of Activated Carbons Produced from Renewable Resources, Proceedings of the 16th International Seminar on Double-Layer Capacitors and Hybrid Energy Storage Devices, 581-607 (Deerfield Beach, Florida, Dec. 4-6, 2006).
Wang et al., "Pyrolysis Temperature and Time Dependence of Electrical Conductivity Evolution for Electrostatically Generated Carbon Nanofibers", *IEEE Trans. Nanotech.*, vol. 2, No. 1, pp. 39-43, 2003.
Eric W. Weisstein. "Circle Packing." From *MathWorld*—A Wolfram Web Resource. http://mathworld.wolfram.com/CirclePacking.html, Printed Dec. 13, 2005. 7 pages.
Weisstein, Sphere Packing, *CRC Concise Encyclopedia of Mathematics*, $2^{nd}$ Edition. 6 pages.
Bernd Willer, "Investigation on Storage Technologies for Intermittent Renewable Energies" Evaluation and Recommended R&D Strategy, Institut für Solare Energieversorgungstechnik (ISET) e. V., Jun. 17, 2003, pp. 1-23.
Williams et al., "Random packings of spheres and spherocylinders simulated by mechanical contraction", *Physical Review*, vol. 67, pp. 051301-1-051301-9, 2003.
Feng-Chin Wu, Ru-Ling Tseng, Chi-Chang Hu, and Chen-Ching Wang, The capacitive characteristics of activated carbons—comparisons of the activation methods on the pore structure and effects of the pore structure and electrolyte on the capacitive performance, 159(2), J. Power Sources 1532, 1532-1542 (Elsevier B.V. 2006).
Xing et al., "Synthesis and Electrochemical Properties of Mesoporous Nickel Oxide", *J. Power Sources*, vol. 134, pp. 324-330, 2004.
Yamada et al., "Electric Double Layer Capacitance Performance of Porous Carbons Prepared by Defluorination of Polytetrafluoroethylene with Potassium", *Electrochemical and Solid State Letters*, vol. 5, No. 12, pp. A283-A285, 2002.
Yoon et al., "Electric Double-Layer Capacitor Performance of a New Mesoporous Carbon", J. Electrochemical Society, vol. 147 No. 7, pp. 2507-2512, 2000.
Yoshizawa et al., "Coal-Based Activated Carbons Prepared with Organometallics and Their Mesoporous Structure", *Energy & Fuels*, vol. 11, pp. 327-330, 1997.
Zeng et al., "Choosing the Impregnants by Thermogravimetric Analysis for Preparing Rayon-Based Carbon Fibers", Journal of Inorganic and Organometallic Polymers and Materials, vol. 15, No. 2, pp. 261-267, Jun. 2005.

(56) References Cited

OTHER PUBLICATIONS

Zeng et al., "The Structural Transitions of Rayon Under the Promotion of a Phosphate in the Preparation of ACF", Cellulose, vol. 15 No. 1, pp. 91-99, 2007.
Zhi-Chang et al., Study on Activation of Pitch-based Carbon Spheres Impregnated with Different Metals, Mat.Sci. Eng., Vol. No. 14, 1999. 4 pages.
Office Action from Indian Application No. 1608/MUMNP/2008, dated Oct. 17, 2012, 1 page.
Bae et al., "New Chiral Heterogeneous Catalysts Based On Mesoporous Silica: Asymmetric Diethylzine Addition to Benzaldehyde", Chem. Commun. 2000, pp. 31-32.
Han et al., "Novel Silica-Sol Mediated Synthesis of High Surface Area Porous Carbons", Carbon, vol. 37, 1999 pp. 1645-1647.
Han et al., "Simple Silica-Particle Template Synthesis of Mesoporous Carbons", Chem. Commun., 1999, pp. 1955-1956.
International Preliminary Report on Patentability and Written Opinion of the International Searching Authority for PCT Application No. PCT/US2006/003964, Mar. 31, 2009. 6 pages.
Joho et al., "The Correlation of the Irreversible Charge Loss of Graphite Electrodes with their Double Layer Capacitance", PSI Scientific Report 2000. vol. V, General Energy, pp. 69-70, 70 (Paul Scherrer Institut, Mar. 2001).
Kim et al., "Cobalt on Mesoporous Silica: The First Heterogeneous Pauson-Khand Catalyst", J. Am. Chem. Soc., vol. 122, 2000, pp. 1550-1551.
Lipka, S.M. et al., "Alternative Material Chemistries for Hybrid Electrochemical Capacitors," 16th International Seminar on Double Layer Capacitors & Hybrid Energy Storage Devices, Dec. 4-6, 2006, 30 pages.
Shen, Wenzhong et al., "Development of mesopore in activated carbon by catalytic steam activation over yttrium and cerium oxides," Journal of Materials Science Letters, 22, 2003, pp. 635-637.
Signorelli, Riccardo et al., "High Density Energy Storage Using a Nanotube-Enhanced Ultracapacitor," 16th International Seminar on Double Layer Capacitors & Hybrid Energy Storage Devices, Dec. 4-6, 2006, 18 pages.
Subbiah et al., "Electrospinning of Nanofibers," Journal of Applied Polymer Science, vol. 96, No. 2, pp. 557-569, 2005.
Office Action from Japanese Application No. 2008-553215, dated Jun. 26, 2012, 5 pages (with translation).
Office Action from Japanese Application No. 2008-555389, dated Jul. 3, 2012, 6 pages (with translation).
Office Action from counterpart Chinese Application No. 200680052104.0, dated Jul. 23, 2012, 12 pages.
Office Action from Korean Application No. 10-2008-7007218, dated Aug. 22, 2012, 19 pages (with translation).
Office Action from co-pending U.S. Appl. No. 12/070,062, dated Sep. 18, 2012, 5 pages.
Office Action from co-pending U.S. Appl. No. 11/345,188, dated Sep. 24, 2012, 14 pages.
Office Action from Korean Application No. 10-2008-7021383, dated Sep. 18, 2012, 9 pages (with translation).

\* cited by examiner

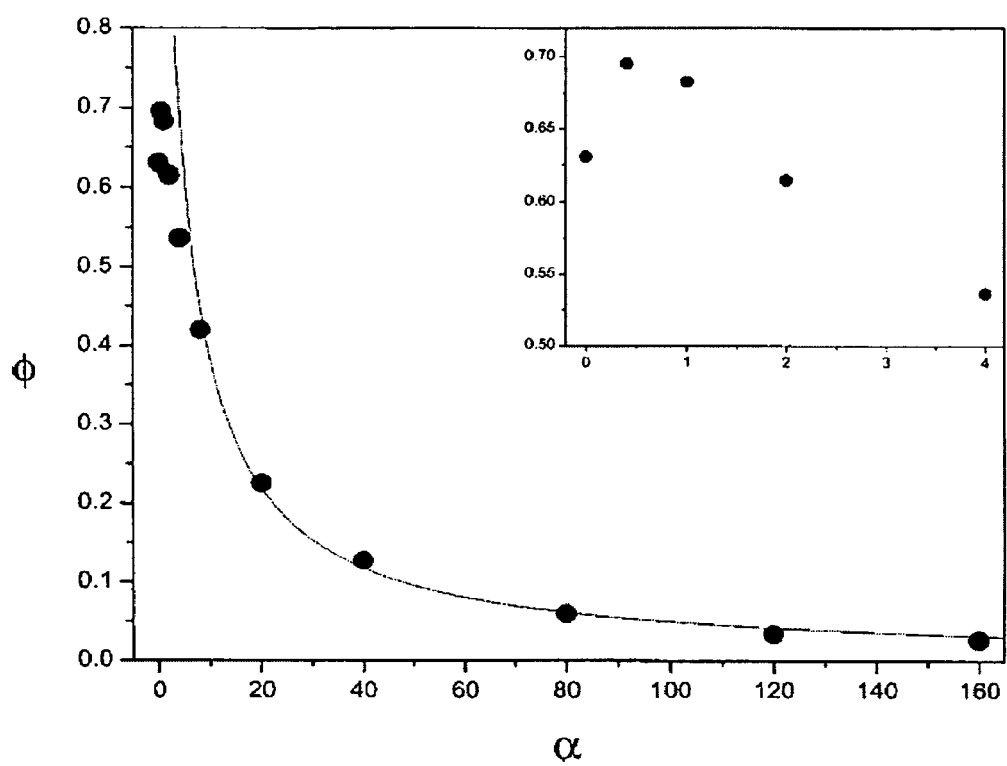

NON-WOVEN FIBROUS MATERIALS AND ELECTRODES THEREFROM

This application is a divisional of U.S. application Ser. No. 11/345,188, filed Jan. 31, 2006. The disclosure of this priority application is incorporated by reference herein in its entirety.

TECHNICAL FIELD

The present invention relates to fibrous materials composed of activated carbon fibers and to methods for their preparation. The activated carbon fibers may be used in all manner of devices that contain activated carbon materials, including but not limited to various electrochemical devices (e.g., capacitors, batteries, fuel cells, and the like), hydrogen storage devices, filtration devices, catalytic substrates, and the like.

INTRODUCTION

Electric double layer capacitor designs rely on very large electrode surface areas, which are usually made from "nanoscale rough" metal oxides or activated carbons coated on a current collector made of a good conductor such as aluminum or copper foil, to store charge by the physical separation of ions from a conducting electrolyte salt into a region known as the Helmholtz layer. This Helmholtz layer, which forms for a few Angstroms beyond the electrode surface, typically corresponds to the first two or three molecules from the surface. There is no distinct physical dielectric in an EDLC, which is provided instead by the electromagnetically determined Helmholtz layer. Nonetheless, capacitance is still based on a physical charge separation across an electric field. Because the electrodes on each side of the cell store identical but opposite ionic charges at their surfaces while the electrolyte between them (but beyond the Helmholtz layer) is depleted and, in effect, becomes the opposite plate of a conventional capacitor, this technology is called electric double layer capacitance. The electrodes are physically separated by a porous thin film spacer similar to electrolytic capacitors or lithium ion batteries. Present EDLCs have frequency response (response curve or RC) constants ranging from milliseconds to seconds. However, commercial EDLCs (sometimes called ultracapacitors) are presently too expensive and insufficiently energy dense for applications such as hybrid vehicles and are used instead primarily in consumer electronics for fail-soft memory backup.

It is generally accepted that EDLC carbon surface pore size should be at least about 1-2 nm for an aqueous electrolyte or about 2-3 nm for an organic electrolyte to accommodate the solvation spheres of the respective electrolyte ions in order for the pores to contribute surface available for Helmholtz layer capacitance. Pores also should be open to the surface for electrolyte exposure and wetting, rather than closed and internal. At the same time, the more total open pores there are just above this threshold size the better, as this maximally increases total surface area. Substantially larger pores are undesirable because they comparatively decrease total available surface. Research by others has shown that capacitance improves as average pore size increases from about 4 to about 20 nm Conventional activated carbons used in such ELDC devices have many electrochemically useless micropores (i.e., below 2 nm according to the IUPAC definition). The pore size must be approximately the sphere of solvation of electrolyte ions, or larger, for the Helmholtz layer to form. For organic electrolytes, these pores should ideally be larger than 3 to 4 nm. In the best highly activated electrochemical carbons reported in the literature, actual measured EDLC is less than 20% of theoretical due to suboptimal pore size distributions, with a large fraction (typically more than a third to half) being micropores that cannot contribute capacitance and a growing fraction of macropores (depending on degree of activation) that reduce overall surface area. By contract, certain templated carbons with optimal pore sizes and shapes governed by the precursor template material have demonstrated capacitance approaching theoretical values except for losses introduced by the formation of electrode materials made from the carbon particles.

Performance can be optimized by increasing the useful surface of the carbon sufficiently that both more capacitance and less cost (from less material required) are achieved. In principal, there are two ways that capacitance can be increased. The primary way is an enhanced effective carbon surface. The IUPAC nanotechnology definition is potentially helpful for organic electrolyte's conventional wisdom on feature dimensions: micropores are ≤2 nm, mesopores are >2 and ≤50 nm, and macropores are >50 nm. The conventional goal is therefore to generally maximize mesoporous surface.

The secondary way is formation of electrode materials taking full advantage of the carbon surface that exists. For cost and density reasons, activated carbon powder is commonly packed onto the current collector foil to some depth, typically 50 to 150 microns. To maximize surface, the powder particles need to be randomly packed as tightly as possible. Conventionally, this is done with milled irregular shapes in a particle size distribution ranging over several fold increases in diameter (5 to 20 microns advertised with Kuraray BP20, or 3 to 30 microns with $d_{50}$ of 8 microns according to Maxwell patent 6643119) so that the smaller particles fill voids between larger particles.

Technically these are polydisperse random packings. Packing density can be adjusted somewhat by the shape of the size distribution. Fines reduce void/volume porosity. Such material voids are commonly thought to be three orders of magnitude larger than the macropores of the IUPAC definition, although technically within it. To eliminate terminological confusion in this discussion, micron scale material voids are called material pores (material porosity) to distinguish from the nanoscale surface pores on or within carbon particles.

It is useful in this context to introduce a concept, intrinsic capacitance, and term, compaction loss. Intrinsic capacitance is the ideal capacitance of the total effective carbon surface when fully double layered. The closest measurement to this idea is "carbon Helmholtz capacity" or $C_H$ in $\mu F/cm^2$. Kinoshita compiled many reported $C_H$ measurements in *Carbon Electrochemical and Physical Properties* (1988); more recent papers place the range in organic electrolytes between 3 and 20. Conventional wisdom is that the orientation of graphite crystallite exposed edges plays a role in explaining these differences. Most (if not all) of these $C_H$ measurements are based on three electrode reference measurements of capacitance and a BET surface estimate and therefore include both compaction loss and any surface measurement error introduced by the BET methodology. Surprisingly, since much activated carbon surface consists of micropores that cannot contribute substantial organic electrolyte capacitance, some of the observed experimental variation in different carbons has to come from the material porosity of the formed electrode material.

Compaction loss is the difference (in F/g, F/cc, or percent) between the intrinsic capacitance of a carbon and the traditional specific capacitance of a somehow formed electrode used as the metric in the industry. Industry experts guesstimate compaction loss ranging from a low of about 30% to over 80%. The actual figure will also vary with electrode thickness for any given material.

Compaction losses originate from at least five separate phenomena. First, random packing of particles of differing sizes results in highly variable material voids. Such voids are at best long and tortuous, and at worst completely cut off from electrolyte by random restrictions (unwetted surface). Any restriction smaller than about 6 nm—easily arising at the conjunction of irregularly shaped interlocking particles ranging from a few tens of nanometers to a few microns diameter—can be shown to result in being completely packed and therefore blocked by adjacent solvated electrolyte ions once a charge is places on the device. No further mass transport or electrolyte diffusion is then possible. Recent research has surprisingly shown that a substantial proportion of a typical activated carbon is actually agglomerations of finer particles produced by activation. One study shows them to average less than 100 nm, but to cluster onto (owing to Van der Waal forces) or to "decorate" micron sized larger particles. The result is that such a restricted region becomes locally depleted of ions, since there is no possibility of further mass transport into the region. The region's surface is underutilized. Second, packing smaller carbon particles into material voids for more surface results in displacing electrolyte from within the material to beyond it, increasing ionic conductivity and mass transport requirements from beyond the electrode surface, for example from the separator region. In the worse case this limits effective capacitance. In the best case it increases RC and undesirably slows the frequency response of the device. Third, more small particles increase the number of grain boundaries across which electricity must flow in the electrode. That undesirably reduces the conductivity of the electrode, undesirably increases its ESR, and therefore increases its RC. Fourth, to overcome the conductivity problem introduced by many small particles, it is common to add a proportion of conductive carbon particles that do not contribute effective surface. Fifth, to bind such a polydispersion of fine irregular particles together, it is common to add a proportion of a binder such as PFTE that does not contribute to effective surface. Experimental electrodes reported in the scientific literature may have as much as 10% each of conductor carbon and binder, meaning only 80 percent of the electrode mass is capable of contributing effective capacitive surface.

It is desirable to maximize the performance of EDLCs.

SUMMARY

The present inventor has found that by forming a fibrous material from activated carbon fiber fragments of substantially similar diameter and aspect ratio α that the performance of EDLCs can be increased.

In another aspect, the present inventor has found that the performance of EDLCs can also be increased using a fibrous material formed from a mixture of (a) 50 to 95+% of a first population activated carbon fiber fragments and (b) a second population of carbon fiber fragments of substantially similar or equal diameter to the first population and of longer length than the first population.

BRIEF DESCRIPTION OF DRAWINGS

FIG. 1 is a graph depicting the final volume fractions φ for the amorphous packings as a function of aspect ratio α. The solid line is a theoretical fit from the random contact equation φα=5.1. The inset shows a magnified view of the same graph at low aspect ratio. Graph reproduced from Physical Review E 67 051301, 051301-5 (2003).

DETAILED DESCRIPTION

Throughout this description and in the appended claims, the following definitions are to be understood:

The term "aspect ratio" as used in reference to a carbon fiber or fiber refers to the length of the fiber divided by the diameter of a fiber.

The term "compaction loss" as used to refer to electrodes refers to the difference (in F/g, F/cc, or percent) between the intrinsic capacitance of a total effective carbon surface and the traditional measured specific capacitance.

The term "intrinsic capacitance" refers to the ideal capacitance of the total effective carbon surface when fully double layered.

The term "mesoporous" as used in reference to a carbon fiber or fiber describes a distribution of surface feature pore sizes wherein at least about 20% of the total pore volume has a size from about 2 to about 50 nm.

The phrase "catalytically-activated" as used in reference to a carbon fiber or fiber refers to its pore-containing surface wherein the pores have been introduced by a catalytically controlled activation (e.g., etching) process. In some embodiments, metal oxide particles of a chosen average size serve as suitable catalysts and a least a portion of the metal oxides remain in or on the fibers after the activation process.

The term "fiber" used in reference to polymers and carbon refers to filamentous material of fine diameter, such as diameters less than about 20 microns, and preferably less than about 10 microns, such as the type that may be obtained using conventional spinning processes.

The term "nanofiber" used in reference to polymers and carbon refers to a filamentous material of very fine diameter less than 1 micron, and preferably nanoscale (100 nanometers or less in diameter), such as the type that may be obtained using an electrospinning process.

Activated Carbon Fibers

Carbon fibers embodying features of the present invention can be prepared by any known process. In general carbon fibers are prepared by polymerizing a monomer to form a polymer fiber and carbonizing at least a portion of the polymer fiber to provide a carbon fiber.

Carbon fibers can be activated using any known methods. For example, Kyotani, Carbon, 2000, 38: 269-286, have summarized available methods for obtaining mesoporous carbon fibers. Hong et al., Korean J. Chem. Eng., 2000, 17(2), 237-240, described a second activation of previously activated carbon fibers by further catalytic gasification. Preferred methods for preparing carbon fibers with controlled mesoporosity are described in U.S. application Ser. No. 11/211,894, filed Aug. 25, 2005; the entire contents of that application are incorporated herein by reference. Ideally, one should control the activation of the carbon fiber to ensure mesopore formation, as described in U.S. application Ser. No. 11/211,894. However, activated carbon fibers formed from other methods of preparation can also be used in this invention.

In some embodiments, the activated carbon fibers of the present invention comprise diameters of about 10 microns or less, in other embodiments of about 5 microns or less, in other embodiments of about 1 micron or less, in other embodiments of about 500 nm or less, in other embodiments of about 100 nm or less. The preferable diameter depends on the process used to create the fibrous material.

The activated carbon fibers of the present invention have pores (i.e. they are not smooth surfaces). The size of pores introduced on the fiber surfaces and into the fibers during activation depends on the process, and a preferred embodiment is the catalytic activity of a nanoparticulate metal oxide catalyst, its amount, and/or the size of its nanoparticles as well as the conditions of activation. In general, it is desirable to select pore sizes large enough to accommodate the particular electrolyte used to an optimal surface packing but substantially larger in order to prevent unnecessary reductions in total fiber surface area.

The average pore size typically ranges from about 1 nm to about 20 nm. Ideally, the average pore size is from about 3 nm to 15 nm, preferably 6-10 nm.

Homogenous Carbon Fiber Fragments

The present invention is based on the realization that a reasonably homogenous population of rod-shaped fragments of carbon fibers can be used to maximize both the surface area and the porosity of a fibrous material formed therefrom. A first surprising aspect of the invention is that both mathematical models and experimental evidence show that low a fibrous materials (short rods, cylinders, or fibers) can randomly back as densely as spheres. The theoretical three dimensional random packing limit for spheres is 0.64, known as the Bernal limit. Empirically, the Bernal limit is measured at about 0.63 due to inhomogeneous experimental materials. Surprisingly, cylinders with aspect ratio $\alpha$ of 2 have a packing density $\phi$ of about 0.62. Advantageously for certain materials such as electrodes, they about the same random packing contacts (5.4±0.2, empirically verified in many experiments) as spheres of equivalent volume (and less than for irregular shapes) but also have more than twice the surface for an equal diameter material, so proportionately fewer points of average contact and potential surface occlusion per unit surface.

A regular number of contacts on longer conducting elements with reduced numbers of total grain boundaries through the material to the collector foil improves electrical conduction and reduces ESR. The long narrow void channels in cylinder packings have electrolyte diffusion and ionic conductivity advantages, similar to carbon fiber cloth, but without the same material density limitations and at lower cost since the weaving step is avoided. Ordinary carbon papers or felts are comprised of a highly polydisperse aspect ratio distribution of mostly longer fibers that cannot achieve the same random packing density and total surface. Ordinarily, the expense of manufacturing fiber is rationalized by using its length (for example, for tensile strength or conductive continuity). Surprisingly, the present invention proposes to take advantage only of the cylindrical geometry in short lengths. Since these random packing properties are scale invariant, they can be predictably extended to a second generation of finer fibrous materials.

During activation, carbon fibers can fragment. For the present invention, the fibers are further fragmented so that the average length of the fibers is relatively homogenous. Fibers can be fragmented using any know means such as chemical or mechanical milling, and screened by means such as advanced air classifiers into particle distributions without excessive polydispersion, for example a distribution of aspect ratios from 1 to 5 but concentrated within 2 to 3. By way of contrast, a typical commercial activated carbon particulate dispersion is from 3 to 30 microns with a median of 8 microns; it is highly polydisperse. The many smaller particles are meant to fit into the voids between the fewer large ones to maximize total surface, but giving rise to compaction loss.

The carbon fibers embodying features of the present invention may be broken up into shorter fragments (e.g., after carbonization and during or after activation) and then applied to a substrate (e.g., as a slurry) to form a non-woven paper-like layer. A particulate-like short fiber fragment powder may be made from the bulk longer material by crushing, milling, chopping, grinding, chemical milling, etc., with an engineered fragment length distribution for subsequent coating onto a substrate (e.g., an electrode surface).

In general, the population of fragments for maximal random packing has an average length of one to five times the diameter; that is an aspect of 1 to 5. Aspect ratios less than 1 constitute fines that can "clog" material pores; higher aspect ratios do not pack as densely. An aspect ratio can be selected for a specific device characteristic; for example, for power density more material porosity is desirable to enable electrolyte mass transport (higher ratio), while for energy density more surface from a denser packing might be desirable (lower ratio). In practice, milling and screening processes result in a particle distribution with some dispersion around the engineering design goal.

In general, as the diameter of fibers is reduced, increasing their total surface, it becomes more difficult but less important to achieve single digit aspect ratios. Somewhat lower packing density is offset by higher individual fiber surface. To maintain conductivity along the fiber axis and not introduce too many grain boundaries, a practical minimum average length is envisioned. In some embodiments as with 7 micron diameter fiber this length may be 15 micron at an aspect ration around two. In some embodiments with 5 micron diameter fibers it may be 10 micron length also at aspect ratio 2. For electrospun nanofibers below one micron in diameter, a preferred length may remain a few microns for conductivity, resulting in aspect ratios that increase as fiber diameter decreases. In general, however, aspect ratios for the average material should remain below 20 to achieve reasonable material density greater than about 50%. The engineering tradeoffs are illustrated in FIG. 1 which shows theoretical and experimental results for monodisperse packings (taken from Physical Review E27 051301 (2003).

The aspect ratio distribution of the resulting fibrous powder will result in a material of predictable average density and porosity according to these principles of random packing.

Heterogeneous Mixture of Carbon Fiber Fragments

It is also within the scope of the present invention to have a multimodal mixture of activated carbon fiber fragments. The first population would comprise fragments with reasonably homogenous lengths and diameters. Other populations of activated fiber fragments would contain substantially the same diameter as the first population, but would have longer lengths and higher aspect ratios.

As density and total surface are not critically dependent on some long fragments (at substantially higher aspect ratios) in a mix of relatively homogenous smaller ones, it is possible to have a second population of fiber fragments with longer lengths than the first population without substantially affecting density or surface. Technically, this is a bimodal or multimodal polydispersion. Moderate proportions of longer fibers can be admixed, each averaging 5.4 contacts for each few diameters worth of length. This would have major advantages for material conductivity and ESR by providing semi-continuous conductance pathways and further reducing grain boundary interfaces.

In one embodiment, the heterogeneous mixture contains from about 50 to 95% of a first population of substantially homogenous (not highly polydisperse) fragments and the balance fragments of substantially similar diameter to the first population, but with longer lengths.

In one embodiment the length of the fibers in the second population is greater than about twice the length of the first population, in another embodiment the second population is five times as long. In another embodiment, the longer fibers are 50, 100, 150, or 200 microns in average length irrespective of the first population, said lengths corresponding to the desired average thickness of the electrode material.

Fibrous Materials

The fibers of the present invention can be further processed to provide a material according to the present invention compatible with conventional particulate carbon coating processes as described in U.S. Pat. Nos. 6,627,252 and 6,631,074, the entire contents of both of which are incorporated herein by reference, except that in the event of any inconsistent disclosure or definition from the present application, the disclosure or definition herein shall be deemed to prevail.

The density of the resulting "paper-like" fibrous material, such as coated onto a current collector foil, is an engineered property of the length of the fiber fragments compared to their diameter (their aspect ratio), the polydisperse distribution of the lengths compared to the average diameter, and optionally post deposition densification (e.g. by pressure). If length approaches diameter, then the fragments will be more like conventional particles and pack more densely with less porosity in the resulting material. If length is much larger than diameter, then the aspect ratio will be high and packing less dense (i.e. a more porous void to volume ratio material). The average aspect ratio of length to diameter may be adjusted and/or blends of different ratios may be used to provide any material porosity (void/volume ratio) desired within the limits of random packing principals. In some embodiments, at least about 50% of the total number of carbon fiber fragments have a length ranging from about 5 to about 30 microns equivalent to some activated carbon particulate materials. In other embodiments, at least about 50% of the total number of fragments has aspect ratios lower than 30. In other embodiments, average aspect ratios are lower than 20. In other embodiments, average aspect ratios are lower than 10. In other embodiments, where the fiber fragment diameters at or below 100 nm more closely resemble carbon nanotubes, at least about 50% of the total number of carbon fiber fragments are less than 1 micron in length with aspect ratios less than 20.

In some embodiments, the density of the fibrous material may be further increased (e.g., by simple pressure rolling to a desired thickness or the like). In some embodiments, the density is increased prior to the carbonizing and/or activation, and in other embodiments, the density is increased subsequent to the carbonizing and/or activation. In some embodiments, the thickness of the dense fibrous material is less than or equal to about 200 micron, in other embodiments, less than or equal to about 150 microns, and in other embodiments, less than or equal to about 100 microns.

Capacitors

EDLC electrodes are typically made of activated carbon bonded directly or indirectly onto a metal foil current collector, although metal oxides can be used. In accordance with the present invention, activated carbon materials prepared by the methods described herein may be applied to current collectors together with additional metal oxides or the like for hybrid characteristics including enhanced pseudocapacitance.

A capacitor embodying features of the present invention includes at least one electrode of a type described herein. In some embodiments, the capacitor further comprises an electrolyte, which in some embodiments is aqueous, in other embodiments is organic. In some embodiments, the capacitor exhibits electric double layer capacitance. In some embodiments, particularly when residual metal oxide is present on the surface of the activated carbon fibrous material, the capacitor further exhibits pseudocapacitance.

Conventional carbon EDLCs with organic electrolytes use either propylene carbonate or acetonitrile organic solvents and a standard fluoroborate salt. Some carbon and most commercial metal oxide EDLCs use aqueous electrolytes based on sulfuric acid ($H_2SO_4$) or potassium hydroxide (KOH). Any of these electrolytes or the like may be used in accordance with the present invention.

Since organic electrolytes have lower conductivity than aqueous electrolytes, they have slower RC characteristics and higher ESR contributions, and reach mass transport pore restrictions at substantially larger geometries since they are much larger solvated ions. However, since they have breakdown voltages above 3 V compared to 1 V with aqueous electrolytes, organics produce higher total energy density since total energy is a function of voltage squared. Carbon pores and materials optimized for organics would optionally work for aqueous electrolytes also, since aqueous solvation spheres are smaller. This would allow, for example, ultracapacitor devices to be tailored to RC requirements irrespective of carbon manufacture by changing the electrode packing density via aspect ratio, and by changing electrolyte. Hybrid devices would naturally have a wider range of total RC characteristics since they combine the EDLC with the PC capacitive phenomena. The practical range for use in hybrid electric vehicles is less than about one second to over about 15 seconds, and for distributed power less than about 0.01 seconds to over about 1 second.

Activated mesoporous carbon fibers or fibers, or their respective fragments, embodying features of the present invention may be incorporated into all manner of devices that incorporate conventional activated carbon materials or that could advantageously be modified to incorporate fibrous carbon materials of engineered material geometry, surface, porosity, and conductivity. Representative devices include but are not limited to all manner of electrochemical devices (e.g., capacitors; batteries, including but not limited to one side of a nickel hydride battery cell and/or both sides of a lithium ion battery cells; fuel cells, and the like). Such devices may be used without restriction in all manner of applications, including but not limited to those that potentially could benefit from high energy and high power density capacitors or the like.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. An electrode comprising:
   a current collector; and
   a non-woven fibrous layer covering at least a portion of the current collector, wherein the non-woven fibrous layer comprises:
   activated carbon fiber fragments generated from at least one activated carbon fiber, wherein a first population of the activated carbon fiber fragments comprises greater than about 50% of the activated carbon fiber fragments, wherein the activated carbon fiber fragments have substantially an identical diameter, and wherein an average aspect ratio of the first population of activated carbon fiber fragments is between 1 and 5; and
   wherein a second population of activated carbon fiber fragments having: 1) substantially an identical diameter as the activated carbon fragments of the first population of activated carbon fiber fragments, and 2)

average lengths of greater than 50 microns that exceed average lengths of the first population of activated carbon fiber fragments.

2. The electrode of claim 1, wherein a thickness of the non-woven fibrous layer is less than or equal to about 200 micron.

3. The electrode of claim 1, wherein an average diameter of the first population of activated carbon fiber fragments is less than 1 micron.

4. The electrode of claim 1, wherein an average diameter of the first population of activated carbon fiber fragments is less than 0.5 microns.

5. The electrode of claim 1, wherein an average diameter of the first population of activated carbon fiber fragments is less than 0.1 microns.

6. The electrode of claim 1, wherein the first population of activated carbon fiber fragments have pores ranging in size from about 1 nm to about 20 nm.

7. The electrode of claim 1, wherein the first population of activated carbon fiber fragments have pores ranging in size from about 3 nm to about 15 nm.

8. The electrode of claim 1, wherein the first population of activated carbon fiber fragments have pores ranging in size from about 6 nm to about 10 nm.

9. A device comprising:
an electrode comprising:
a current collector; and
a non-woven fibrous layer covering at least a portion of the current collector, wherein the non-woven fibrous layer comprising:
activated carbon fiber fragments generated from at least one activated carbon fiber, wherein a first population of the activated carbon fiber fragments comprises greater than about 50% of the activated carbon fiber fragments, wherein the activated carbon fiber fragments have substantially an identical diameter, and wherein an average aspect ratio of the first population of activated carbon fiber fragments is between 1 and 5; and
wherein a second population of activated carbon fiber fragments having: 1) substantially an identical diameter as the activated carbon fragments of the first population of activated carbon fiber fragments, and 2) average lengths of greater than 50 microns that exceed average lengths of the first population of activated carbon fiber fragments; and
an electrolyte.

10. The device of claim 9, wherein the electrolyte is aqueous.

11. The device of claim 9, wherein the electrolyte is organic.

12. The device of claim 9, which is a capacitor, battery, or fuel cell.

13. The device of claim 9, wherein an average diameter of the first population of activated carbon fiber fragments is less than 1 micron.

14. The device of claim 9, wherein an average diameter of the first population of activated carbon fiber fragments is less than 0.5 microns.

15. The device of claim 9, wherein an average diameter of the first population of activated carbon fiber fragments is less than 0.1 microns.

16. The device of claim 9, wherein the first population of activated carbon fiber fragments have pores ranging in size from about 1 nm to about 20 nm.

17. The device of claim 9, wherein the first population of activated carbon fiber fragments have pores ranging in size from about 3 nm to about 15 nm.

18. The device of claim 9, wherein the first population of activated carbon fiber fragments have pores ranging in size from about 6 nm to about 10 nm.

19. The device of claim 9, wherein the average lengths of the second population of activated carbon fiber fragments is greater than twice the average lengths of the first population of activated carbon fiber fragments.

20. The device of claim 9, wherein the average lengths of the second population of activated carbon fiber fragments is greater than five times the average lengths of the first population of activated carbon fiber fragments.

21. The electrode of claim 1, wherein the average lengths of the second population of activated carbon fiber fragments is greater than twice the average lengths of the first population of activated carbon fiber fragments.

22. The electrode of claim 1, wherein the average lengths of the second population of activated carbon fiber fragments is greater than five times the average lengths of the first population of activated carbon fiber fragments.

23. The electrode of claim 1, wherein the average aspect ratio of the first population of activated carbon fiber fragments is between 2 and 3.

24. The device of claim 9, wherein the average aspect ratio of the first population of activated carbon fiber fragments is between 2 and 3.

* * * * *